Oct. 20, 1959  P. H. TAYLOR  2,909,398
LIQUID SPRING SEAL

Filed May 18, 1956  4 Sheets-Sheet 1

INVENTOR.
Paul H. Taylor
BY
Wilkinson, Huxley, Byron & Hume
Attorneys.

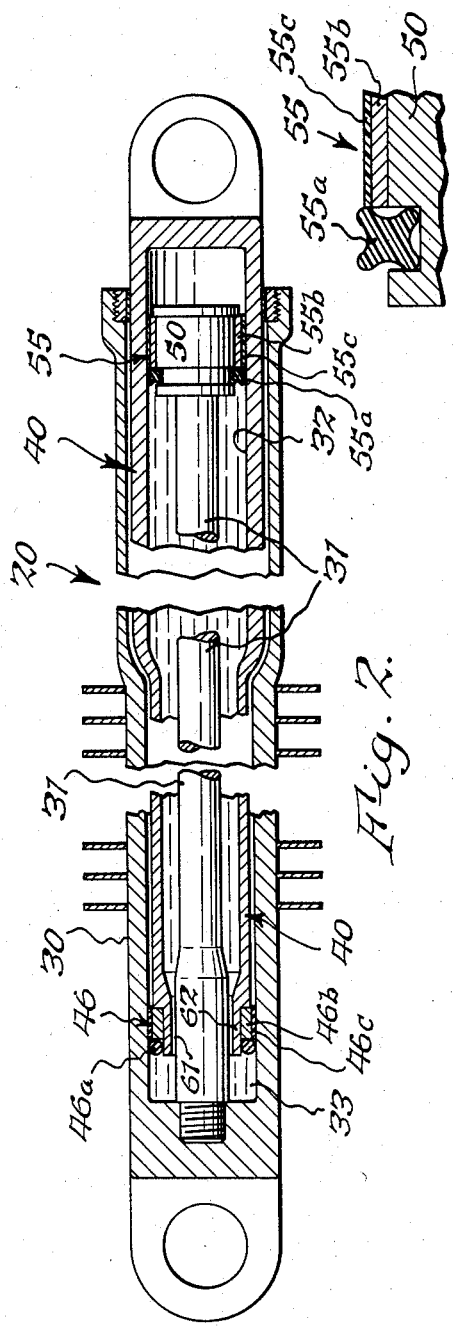
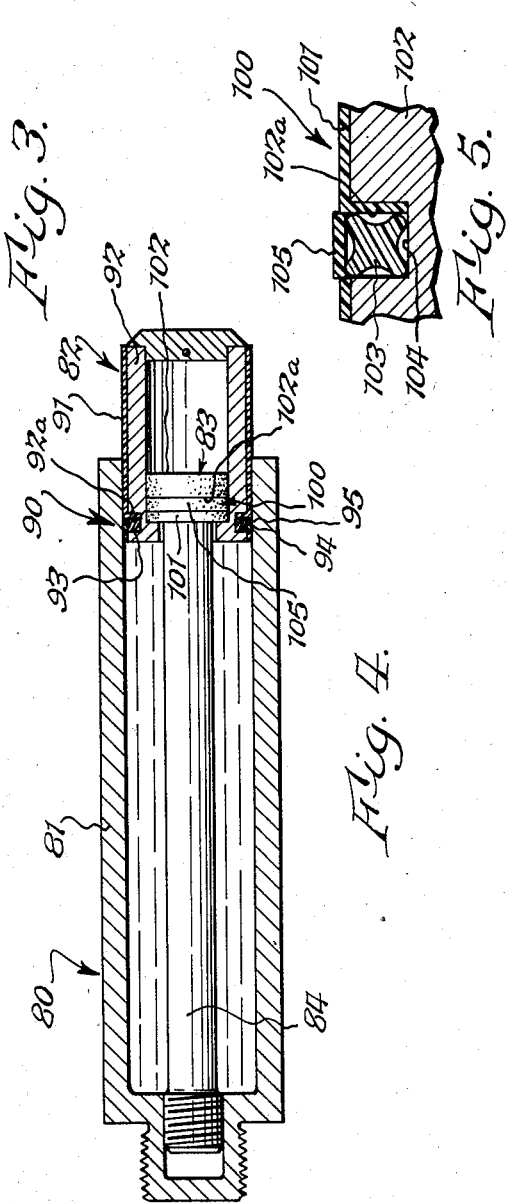

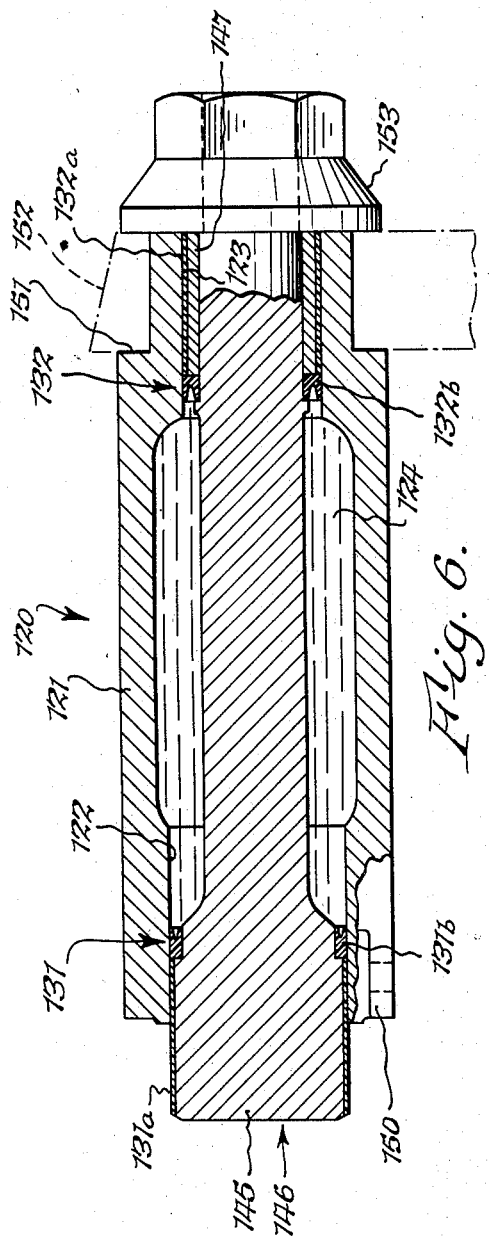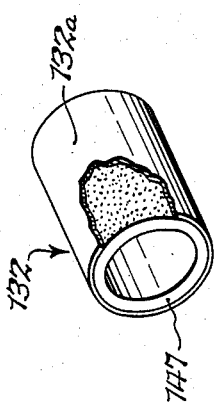

Oct. 20, 1959 P. H. TAYLOR 2,909,398
LIQUID SPRING SEAL
Filed May 18, 1956 4 Sheets-Sheet 4
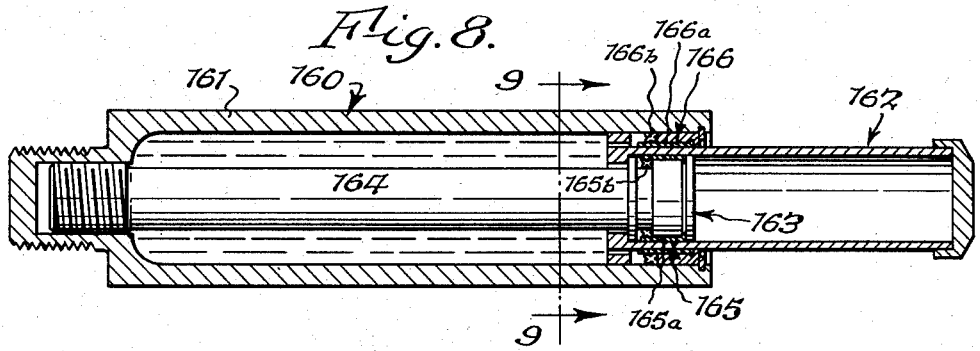
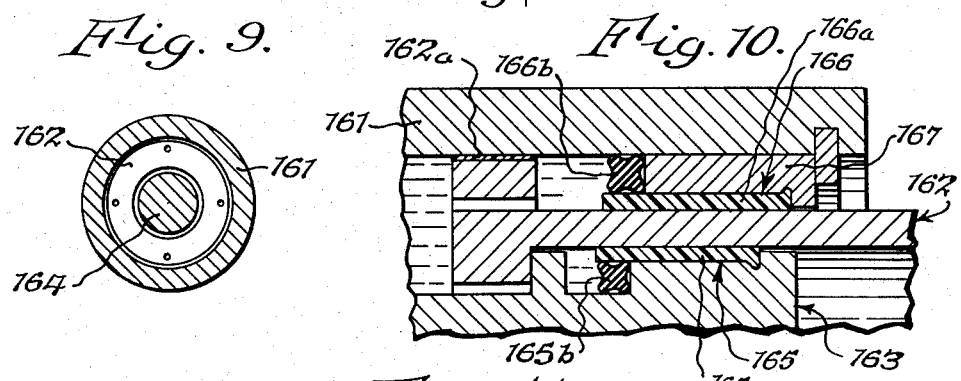
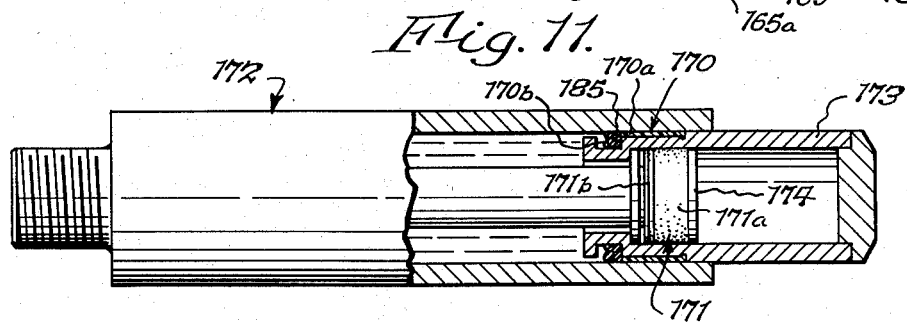
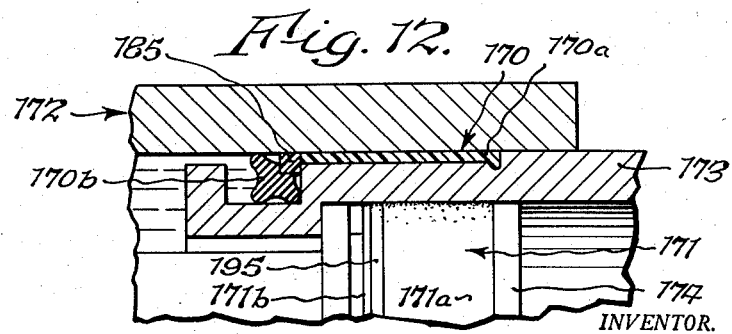
INVENTOR.
Paul H. Taylor
BY
Wilkinson, Huxley, Byron & Hume
Attorneys.

United States Patent Office 2,909,398
Patented Oct. 20, 1959

2,909,398
LIQUID SPRING SEAL

Paul H. Taylor, North Tonawanda, N.Y., assignor to Tayco Developments, Inc., North Tonawanda, N.Y., a corporation of New York Application May 18, 1956, Serial No. 585,746

11 Claims. (Cl. 309—23)

This invention relates to sealing means for high pressure applications, and more particularly to seals for use in devices such as liquid springs, accumulators and the like employing the limited compressibility of non-gaseous materials.

Liquid springs, accumulators and the like employ non-gaseous material compressibility, with or without polymorphic transition or change in form, as the medium of energy storage. Such devices efficiently utilize the limited compressibility of materials such as silicones, fluorocarbons, silver iodides, p-xylene or the like, at pressures from two thousand to fifty thousand pounds per square inch (2,000 to 50,000 p.s.i.). All of these materials are quite compressible relative to most liquids and solids, but they possess little or none of the lubricity associated with liquids commonly used in hydraulic devices. High strength alloy steels must be used to contain the high pressures encountered in liquid springs and the like, and these steels, in the presence of the above-mentioned compressible materials and in the rubbing contact associated with sealing, cause galling or seizing if metallic rubbing occurs.

To avoid galling or seizing in liquid springs, all relatively reciprocable metallic parts must have clearance from each other. If the moving parts, such as pistons or the like, are arranged to ride on relatively dense, high strength plastic seals and guide bushings, metal-to-metal contact is avoided. It has been found that relatively strong plastics such as nylon, "Kel-f" or "Teflon" serve well as seals and guide bushings in connection with high strength steels and in the presence of the above-mentioned compressible materials. However, even when using such high strength plastics, the metallic parts must have sufficient clearance that in the event of a side load on a piston, the maximum elastic distortion of the plastic seal will not permit metal-to-metal rubbing contact on one side. The permissible maximum metallic clearance is quite limited, else the plastic material will extrude through the gap between the mating parts due to the extremely high pressures encountered. Clearances in the range of ten thousandths of an inch (.010") between the mating steel parts at 20,000 p.s.i. internal pressure in the spring are the maximum allowable for nylon, and five thousandths of an inch (.005") is maximum for "Teflon" and "Kel-f."

Under the influence of a side load on a piston, the piston seal will tend to distort or compress on the side which is under compression, and since high strength plastics are fairly rigid, it will pull away from the other side permitting leakage of liquid and failure of the device. To eliminate this condition, long length seals with high interference fits are utilized so that, upon application of a side load, the pre-compressed seal will resist deformation on the compression side, and what little deformation occurs will be compensated for on the other side by the expansion of the pre-compressed seal material to prevent formation of a gap. Such a seal is thus, in essence, both a bearing and a seal.

However, high seal interferences result in high seal friction losses, which in many cases destroy the usefulness of the device. This is particularly true in differential piston area springs such as those shown in my copending applications, Serial No. 481,658, filed January 13, 1955, and Serial No. 467,745, filed November 9, 1954, now Patent No. 2,873,963. These devices are efficiently utilized in vehicle suspensions and other low spring rate devices for which conventional direct acting liquid springs are generally unsuited because of their high spring rates. (For instance, a conventional direct acting liquid spring, not employing a differential area piston, has a minimum spring rate of approximately twenty-five hundred pounds per inch (2500 lbs./in.) because a lower spring rate would necessitate use of a piston which is too small for structural reasons, while a differential piston area spring of the type shown in Figure 4 of my copending application, Serial No. 481,658, has been built and operated at a spring rate of three hundred pounds (300 lbs./in.), which is suitable for light vehicles.) However, a minimum seal friction of approximately two hundred pounds (200 lbs.) has heretofore been encountered even in such differential area liquid springs, whereas in a conventional vehicle shock absorber a seal friction of ten pounds (10 lbs.) is considered maximum.

While the seal friction force is smaller, percentage-wise, in higher spring rate liquid springs, such as gun buffers, die springs, and machine tool springs, which require a maximum return force, high seal friction losses are highly undesirable and sometimes are fatal to practical application of such devices.

The initial, low pressure friction losses can be reduced somewhat by reducing the seal interference, but upon application of higher pressure the seal distorts and seal friction increases. Side loads associated with the normal operation of many such devices soon cause play and seal lip wear resulting in improper functioning.

Liquid springs and the like which are supplied for military applications must operate satisfactorily over a wide temperature range of —70° to +160° F., and this factor introduces an additional difficulty because of the high coefficient of thermal expansion of the plastics utilized as seals and seal bearings. In the low temperature range, the seals tend to shrink sufficiently to by-pass liquid and in the high temperature range they expand to increase the interference fit, causing unmanageable seal frictions. Because of this expansion and contraction difficulty, seal dimensions must be chosen halfway between the maximum interference fit at 160° F. and the minimum fit at —70° F., necessitating extremely close tolerances in the order of plus or minus two ten thousandths of an inch (±.0002").

It will be seen that it would be desirable to provide a non-yielding seal bearing or back-up member. However, no dense, non-yielding material (like a high strength steel) has heretofore been found which will not gall and seize in operation with compressible materials such as those noted above.

A principal object of the present invention is to provide an improved seal in which the seal friction is very small.

Another object of the invention is to provide a seal for compressible-material-devices which efficiently performs both sealing and bearing functions.

A further object of the invention is to provide an improved seal and bearing combination having portions which separately perform efficient sealing and bearing functions in order to reduce seal friction.

Still another object of the invention is to provide a combined bearing and seal wherein side load elastic deformation is reduced or eliminated.

A still further object of the invention is to provide a seal wherein wear of the wiper edge of the seal back-up member is drastically reduced.

An additional object of the invention is to provide an improved seal, for use in liquid springs and the like, which prevents leakage caused by excessive side loads.

Another object of the invention is to provide a seal for low spring rate liquid springs or the like, wherein the seal friction is drastically reduced.

Still another object of the invention is to provide a seal wherein thermal expansion and contraction of the seal back-up member is reduced to eliminate leakage or seal failure in wide temperature range applications.

A related object of the invention is to provide a seal having a bearing portion considerably reduced in thickness in order to minimize the effect of thermal expansion and contraction.

A further object of the invention is to provide a high pressure seal with substantially constant sealing and bearing characteristics over a wide range of temperatures and pressures.

Still another object of the invention is to provide a seal in which static friction is drastically reduced, while still providing efficient high pressure sealing.

Other objects, features and advantages of the invention will be apparent from the following detailed description taken in conjunction with the accompanying drawings, in which:

Figure 2 is an enlarged fragmentary sectional view of the liquid spring construction according to Figure 1 and illustrating one embodiment of the seal construction according to the present invention;

Figure 3 is a further enlarged fragmentary sectional view of a portion of the seal construction shown in Figure 2;

Figure 4 is a fragmentary sectional view of a simple liquid spring construction for machine tool applications or the like employing another embodiment of the seal of the present invention;

Figure 5 is an enlarged fragmentary sectional view of the seal construction shown in Figure 4;

Figure 6 is a sectional view of a single spindle differential area liquid spring illustrating use of two seal constructions according to the present invention;

Figure 7 is a perspective view of a seal bushing as shown in Figure 6 with a portion of the seal coating broken away;

Figure 8 is a sectional view of a liquid spring utilizing a third embodiment of the seal according to the present invention in a male-female, fixed sealing arrangement;

Figure 9 is a sectional view taken along line 9—9 of Figure 8;

Figure 10 is an enlarged fragmentary sectional view of a portion of the seal arrangement shown in Figure 8;

Figure 11 is a sectional view, with parts shown in elevation, of a liquid spring employing two seals according to a fourth embodiment of the invention; and Figure 12 is an enlarged fragmentary sectional view of the seal portion of Figure 11.

Figure 1:
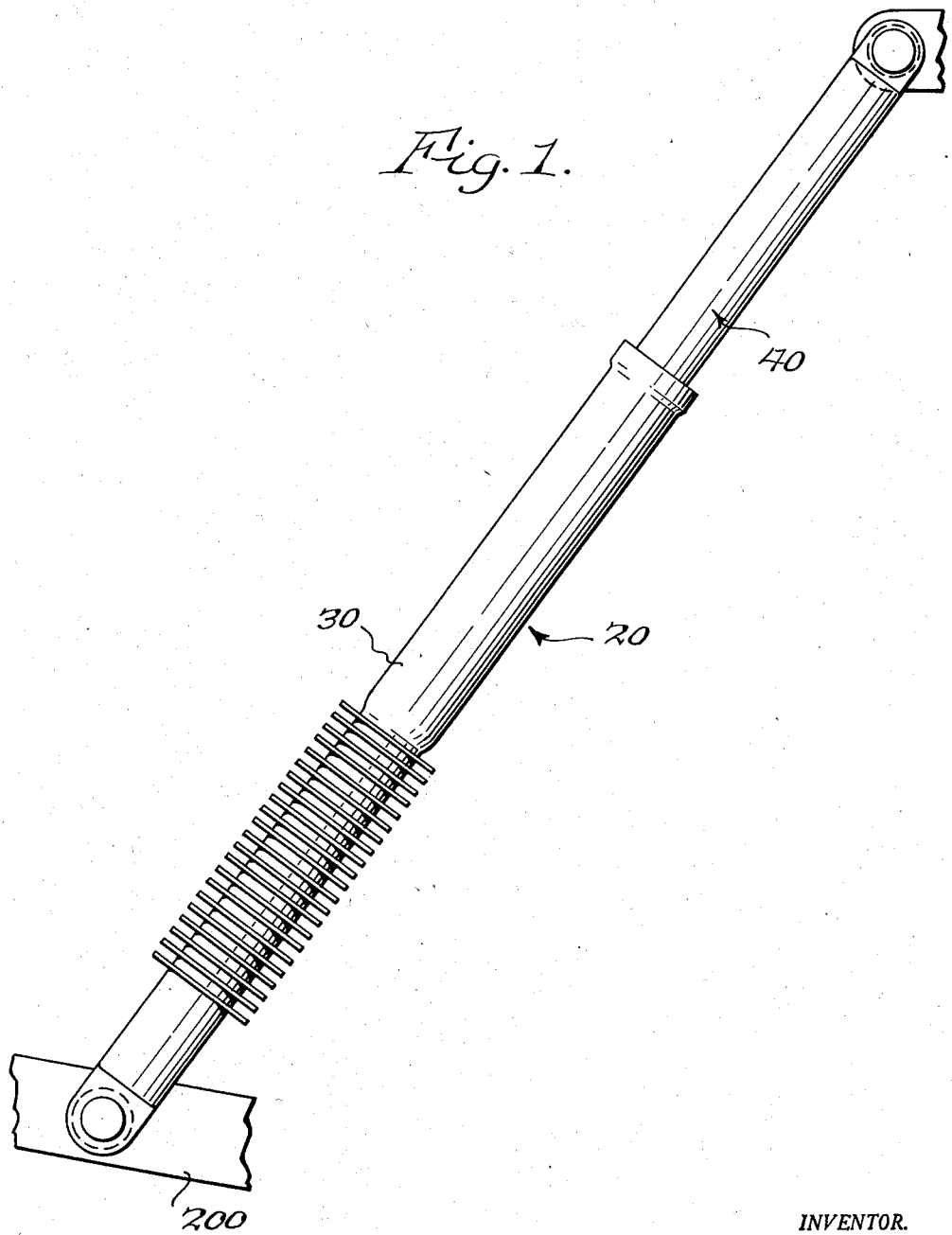
Figure 1 is a side elevational view of a differential area liquid spring utilizing an improved seal according to the present invention.

In Figures 1 and 2 is illustrated a liquid spring-shock strut 20 which is similar to that shown in Figures 4 and 5 of my copending application, Serial No. 481,658, except that the novel seal construction of the present invention is utilized in the present instance. The spring-shock 20 is of the differential area type for providing light spring loads and relatively low spring rates in a liquid spring with large spring liquid displacement, and the spring incorporates liquid metering for shock absorption. The spring 20 incorporates an outer cylinder 30 which is pivotally connected to the suspension portion 200 of a vehicle (not shown). A stepped tubular piston 40 has a portion telescoped within the cylinder 30. A solid piston 50 is disposed within an enlarged portion of a chamber 32 defined in the tubular piston 40, and the solid piston is connected by means of an elongated stem or tension member 31 to the bottom of the cylinder 30.

A seal construction 46 according to the present invention is disposed about the inner end portion of the tubular piston 40 in sealing and bearing contact with the inner wall of the cylinder 30, and another seal construction 55 according to the present invention is disposed about the piston 50 and is engaged in sealing and bearing contact with the inner wall of the tubular piston 40. The entire volume within the cylinder 30 and the tubular piston 40 between the seals 46 and 55 is filled with a compressible liquid of the type previously referred to when the spring 20 is in its fully extended position. Spring action is provided by compression of the liquid during contraction of the strut due to the decrease in the net volume effected by the effective piston area of the stepped tubular piston within the stepped cylinder, representing the difference in swept areas between seals 46 and 55.

Shock absorption is achieved through metering of the liquid between the chamber 32 provided within the tubular piston 40 and a chamber 33 provided within the cylinder 30 and not enclosed within the tubular piston. An annular metering orifice 61 is formed between the stem 31 and a reduced diameter neck 62 provided at the inner end of the tubular piston.

The operation and advantages of the construction shown in Figures 1 and 2, with the exception of the seal of the present invention, are fully discussed in my copending application Serial No. 481,658.

The seals 46 and 55 include respectively, relatively soft pliable elastic sealing rings 46a and 55a of any suitable type, such as the conventional rubber or rubber-like O or "quad" ring types (46a being of the O ring type and 55a being of the "quad" ring type). In prior art devices, such sealing rings are normally backed by a relatively thick, denser plastic member as shown in Rovoldt Patent No. 2,708,573 or Schultz, Patent No. 2,658,809. The sealing rings may, as shown in Rovoldt, have an initial clearance which is absorbed in deformation of the ring on application of pressure to cause an ever-increasing friction as the internal pressure increases, or the rings may be fitted to an initial interference fit. The back-up members in constructions of the prior art ordinarily act as bearings in the event of side loads on the pistons, and since such plastic back-up members are of substantial thickness, they are subject to considerable deformation.

In my improved seals constructions 46 and 55, high strength metallic back-up bushings or core members 46b and 55b, respectively, are provided. These bushings are approximately ten thousandths to fifteen thousandths of an inch (.010" to .015") smaller in diameter than the respective cylinders within which they operate. A dense, high strength plastic material such as nylon, "Teflon" or "Kel-f" is bonded on the outside surfaces of the bushings in any suitable manner, as by hot dipping or the like, to form annular plastic layers or coatings 46c and 55c, respectively, of approximately twenty thousands of an inch (.020") thickness. The plastic plated pressure sealing outside surfaces of the bushings 46a and 55a are then ground or machined to a close sliding fit, for example one ten-thousandth of an inch (.0001") to zero clearance, with the respective cylindrical surfaces. The annular clearances between the respective core members and cylinder walls and consequently the plastic layers 46c and 55c must be of a thickness below that which would allow cold extrusion of the high strength plastic material at the maximum pressures encountered in liquid springs. In addition, the layers must be thin enough that deformation due to abnormal side loads will be negligible in order to prevent formation of a gap and consequent leakage. With high strength plastic materials of the character contemplated it has been found that maximum layer thicknesses of approximately ten thousandths of an inch (.010") meet both of these requirements. In the present instance the plastic layers 46c and 55c do not exceed a thickness of approximately eight thousandths (.008") of an inch.

It is readily apparent that the plastic plated bearing portions 46c and 55c of the seals of 46 and 55 have practically no seal friction with the respective cylindrical walls as compared to prior liquid spring seals which utilize high interference fits. Furthermore, high strength plastics of the character contemplated have low friction coefficients on steel and their static friction and sliding friction coefficients are substantially the same.

With conventional thick plastic back-up rings, the seal friction increases with increase in pressure because of the relatively large area presented to the pressure front and this effect is multiplied where V-grooved ends are presented to the pressure front as in Rovoldt Patent No. 2,708,573. There is no perceptible pressure induced increase in seal friction with respect to the back-up members of the present invention since the core member is of high strength steel and the dense plastic coating is very thin. By the same token, drastic changes in temperature have practically no effect on the plastic coated seal members of the present invention because the coating is so thin that diametrical expansion or contraction is negligible. An approximate three percent differential expansion between high strength steel and dense plastic over a temperature change of −70° F. to 160° F. results in only two to three ten thousandths of an inch (.0002" to .0003") change in thickness of the plastic coating. The differential expansion is critical where a conventional plastic back-up member of the prior art is utilized since such back-up members are many times thicker than the plastic coating of the present invention.

In the Figure 2 embodiment of the invention it will be understood that the O ring 46a and the "quad" ring 55a coact with the back-up members in the normal manner to provide a complete pressure seal. In the present invention, however, the resilient sealing rings are not subjected to the uneven side deformations which occur with seals of the prior art when the pistons are subjected to heavy side loads to cause deformation of the relatively thick plastic back-up members. Furthermore, the sealing rings of this invention are not subject to extrusion between the back-up bushings and the walls of the cylinders as in prior art devices when a gap is formed due to side load deformation. The side load deformation of the plastic coated bushings of the present invention is negligible from a practical standpoint because of the thinness of the plastic coating and the rigidity of the metallic core. Of course, there can be no metal-to-metal galling or seizing contact since side load deformation is eliminated for all practical purposes.

Figures 4 and 5 illustrate a small spring 80 which may be utilized as a pressure pad and stripping spring in a sheet metal die, for example. The spring 80 includes a cylinder 81 which is adapted to receive in telescopic relation a tubular piston 82. The tubular piston, in turn, receives a solid piston 83 which is connected by means of an elongated tension stem 84 to the bottom of the cylinder 81.

According to this embodiment of the invention, a seal 90 is provided on the outer surface of the tubular piston 82 and a seal 100 is provided on the outer surface of the solid piston 83. The seals 90 and 100 comprise respective high strength plastic layers or coatings 91 and 101 bonded on respective high strength steel back-up or core members 92 and 102 and on radial faces 92a and 102a of respective annular packing grooves 94 and 104. The plastic coatings 91 and 101 are not over ten thousandths of an inch (.010") thick and preferably are approximately eight thousandths (.008") of an inch in thickness, and they are formed of high strength, low friction coefficient plastics such as nylon, "Teflon," "Kel-f" or the like. As was the case with the previous embodiment, the metallic back-up members 92 and 102 are very much thicker than the nylon coatings but in the present instance the metallic cores constitute the walls of the pistons themselves. The outside pressure sealing surfaces of the plastic coatings are ground to a close sliding fit of one ten thousandth of an inch to zero (.0001" to 0) clearance with the respective bores in which they ride.

The seals 90 and 100 include respective packing rings 93 and 103 disposed in the annular packing grooves 94 and 104 formed in the metallic back-up members 92 and 102. The packing rings 93 and 103 are formed of relatively soft, pliable resilient material such as rubber or other rubber-like substances and may be in any suitable form such as the "quad" rings as shown. Over the packing rings 93 and 103 are placed thin annular rims, hoops or caps 95 and 105, respectively, which are formed of the same general type of material as the coatings 91 and 101. These annular caps are approximately five to fifteen thousandths of an inch (.005" to .015") in thickness depending on diameter and are arranged to have at least five thousandths of an inch (.005") interference fit within the respective bores. The packing rings 93 and 103 are arranged to have approximately ten to twenty thousandths of an inch (.010" to .020") interference fit within the annular caps so that the packing rings tend to resiliently expand the annular caps further. The annular caps thus act as spring rings and they completely cover the packing rings and the packing grooves, preventing packing ring extrusion and reducing static friction.

The thin plastic rims 95 and 105 are resiliently urged into sealing contact with the walls of the respective bores, and since these elements ride on the bores, they prevent wear and possible extrusion of the soft, elastic packing rings. Furthermore, the very favorable friction characteristics between the dense plastics contemplated and high strength steels are particularly important with respect to this embodiment wherein the thin rims are resiliently expanded against the surfaces of the bores. The use of a dense, resilient plastic rim drastically reduces static friction which is encountered where interference fit rubber or rubber-like packing rings are utilized. Conventional packing rings adhere to the cylinder walls when at rest, and the resultant static or starting friction is a serious disadvantage, particularly in light spring units such as those in automotive applications where the design maximum seal friction is approximately ten pounds. The static friction of nylon on steel, for example, is substantially the same as the sliding friction between these materials, so that provision of annular caps formed of nylon or other dense plastics eliminates the static friction problem.

The plastic rims 95 and 105 are actually annular springs which tend to resiliently expand. This provides a near perfect seal with the walls of the bores. The presence of the relatively soft packing ring within the packing grooves prevents leakage under the ring or through the groove, while at the same time adding to the resilient characteristic of the plastic rim. With an interference fit of approximately five thousandths of an inch (.005") between the plastic rims and the bores, the seal friction amounts to approximately ten pounds, the automotive maximum, with a three quarter inch (¾") diameter seal. At maximum design temperature of 160° F. this interference fit increases to only six and one-half thousandths of an inch (.0065"). At the minimum design temperature of −70° F. there is still an adequate interference fit of three and one-half thousandths of an inch (.0035"). It has been found that at these temperature extremes the total seal friction is not measurably different, thus the seal of this embodiment provides constant seal friction characteristics over an extremely wide temperature range, and without static friction.

The provision of the extensions of the dense plastic coatings over the radial surfaces 92a and 102a in the grooves prevents bubbling under the coatings in certain instances with certain materials.

The dense plastic capped seal of this embodiment eliminates the acute wear problem encountered where ordinary soft packing rings are interference fitted. In such applications frictional heat rapidly breaks down the material of the soft packing rings, and after the interference fit has worn away, leakage occurs.

The seal of this embodiment is particularly well adapted for use in direct acting automotive and aircraft suspensions where high side loads are frequently incurred. The combination of the metal backed, dense plastic coated core member, to practically eliminate side play, with the resilient, wear resistant nylon cap and elastic packing ring unit, to sufficiently accommodate what minute side play might occur, provides a seal which is extremely durable with perfect sealing characteristics and very little seal friction.

In Figure 6 is illustrated a differential liquid spring 120 including a cylinder 121 providing two axially aligned bores 122 and 123 connected by means of a liquid chamber 124. Male seals 131 and 132 according to the present invention are provided about a head portion 145 of a steel piston 146 and about a steel bushing 147 which is secured about the opposite end portion of the piston and which is smaller in diameter than the head portion. The spring is completely filled with a compressible liquid of the type referred to above. When the piston head 145 is moved into the cylinder, the liquid therein is compressed due to the fact that the piston head 145 is larger in diameter than the bushing 147.

The seals 131 and 132 consist of dense plastic layers or coatings 131a and 132a, respectively, bonded to the piston head 145 and the bushing 147, which act as back-up members for soft, pliable packing rings 131b and 132b. The packing rings in this embodiment may be of any desired configuration such as the V rings shown and are preferably formed of a soft plastic such as nylon, formula 6503, which is relatively soft and rubber-like in character, as distinguished from the dense, high strength structural type nylons which have been previously referred to. By utilizing packing rings of this type of material, the low friction characteristics of nylon are enjoyed, while the necessary rubber-like seal characteristics are preserved, so that a near perfect seal is achieved with reduced seal friction.

In gun buffer applications, for which the spring 120 is particularly well suited, the axis of attachment for applying tension to the casing is eccentric to the axis of the piston, as illustrated by the off-center position of a tension attachment lug 150. The compression attachment for the spring is provided by an annular shoulder 151 which bears against a portion 152 of the gun structure. The piston 146 acts as a recoil ram, and the arrangement is such that for each eighteen compression strokes exerted against the ram and absorbed by the annular shoulder 151 against the structure 152 there is one tension stroke of the cylinder exerted on the eccentric connection 150 and resisted by the frame member 152 bearing against an annular washer 153, fixedly secured to the end of the ram. The eccentric load imposed by the tension stroke provides a very heavy side load, normally fatal to successful operation of liquid springs embodying seals of the conventional type, since conventional seals compress drastically under such a side load to allow leakage. As explained above, the seal construction of the present invention eliminates seal deformation and thus prevents such side load failure.

When conventional type seals are used in a ten thousand pound (10,000 lb.) spring, as illustrated in Figure 6, a thirty percent (30%) or three thousand pound (3,000 lb.) seal friction loss is encountered. By substituting seals according to the present invention, seal friction loss on an identical unit is reduced to four hundred pounds (400 lbs.) or less and failure due to side load is eliminated. The gun buffer is designed to operate with a twenty millimeter cannon capable of shooting 1,000 rounds per minute, and at this rate a conventional seal is shortly destroyed due to frictional heat which raises the temperature and internal pressure of the compressible liquid, and in turn permits hot extrusion of the plastic seal out of the clearance between the steel piston and the cylinder. Due to the drastically reduced seal friction resulting from the present invention, this problem no longer exists.

In Figures 8, 9 and 10 is illustrated a liquid spring 160 which is very similar to the construction shown in Figure 4 and includes a cylindrical casing 161, a tubular piston 162, a solid piston 163 riding within the tubular piston, and a stem 164 connecting the solid piston to the bottom of the cylinder 161. In this construction another embodiment of the seals of the present invention is incorporated in a male seal 165 provided about the surface of the piston 163, and a female seal 166 which is connected within the outer end of the cylinder 161 and rides on the outer surface of the tubular piston 162. A plastic coated head or guide 162a is formed on the inner end of the tubular piston.

The seals 165 and 166 include plastic sleeves or layers 165a and 166a and relatively soft elastic packing rings 165b and 166b, respectively. The seal sleeves 165a and 166a are formed of a high strength plastic such as nylon, "Teflon," "Kel-f" or the like, and the packing rings 165b and 166b are formed of relatively soft rubber or rubber-like material and in the present instance are in the form of "quad" rings. The seal sleeve 165a is fixedly secured about the steel piston 163, and the seal sleeve 166a is secured within an annular steel bushing 167. The seal sleeves 165a and 166a are of substantially the same thickness as the dense plastic layers discussed in connection with the previous embodiments, and they perform the same functions. In this embodiment, however, the sleeves perform an additional function in that they extend beyond their respective steel core members to provide annular lips which completely overlap the respective packing rings. The overlapping lips of the seal sleeves perform substantially the same function as the annular rims 95 and 105 of the embodiment in Figures 4 and 5. The packing rings are interference fitted under the overlapping lips so that the lips are resiliently held in sealing engagement with the inside and outside walls of the tubular piston.

A fifth embodiment of the seals of the present invention is illustrated in Figures 11 and 12 in which seals 170 and 171 are provided in a liquid spring construction 172, which is substantially the same as the construction of Figure 4 except for the difference in seals. The seals in this embodiment include plastic layers or sleeves 170a and 171a of nylon or some other high strength plastic, together with relatively soft, elastic packing rings 170b and 171b, which in the present instance are in the form of "quad" rings. The sleeves 170a and 171a are fixedly secured on a steel tubular piston 173 and a steel solid piston 174, respectively, and they are of approximately the same thickness as the dense plastic coatings previously described. Short high strength plastic anti-extrusion spring rings or annular caps 185 and 195 are disposed at the inner ends of the sleeves 170a and 171a, respectively. The rings 185 and 195 are approximately square in cross section and twenty to forty thousandths of an inch (.020" to .040") on a side, and the rings are fitted in the respective bores to five thousandths of an inch (.005″) interference, for example. The packing rings 170b and 171b are partially covered or capped by the spring rings but annular portions of the packing rings are maintained in contact with the bores. The partial capping of the packing rings reduces seal friction and at the same time prevents seal edge chewing in high stress applications where the outside cylinder wall may deflect outwardly one thousandth of an inch (.001″) under high internal pressures. The seal of this embodiment is particularly well adapted for use in extreme low temperature applications where contraction of the high strength plastic may be sizable. In such circumstances the packing rings prevent leakage if the high strength plastic should pull away from the bore slightly. Thus, in part, the anti-extrusion spring rings and the packing rings perform the same function as the annular caps and packing rings of the embodiment of Figures 4 and 5, but, in addition, the sealing rings have portions in direct engagement with the walls of cylinders within which the respective parts reciprocate, similar to the rings of the embodiment of Figures 1–3.

The seal constructions of the present invention represent a substantial improvement over prior liquid spring seal constructions. In many instances the improved seals render practical liquid spring devices which were previously only theoretically usable. The improved seals are particularly advantageously employed in connection with light load liquid springs and in connection with springs subjected to side or eccentric loading or minor wall deflections, but, of course, the principles are efficiently utilized in all types of liquid springs.

Improved seals of the type herein described have actually been cycle tested to two hundred and fifty thousand (250,000) linear inches of seal travel with zero or at least with negligible leakage. Liquid spring seals of the types represented by the prior art tested under the same high pressure conditions fail at a maximum of thirty thousand (30,000) linear inches of seal travel at a pressure of twenty thousand pounds per square inch (20,000 p.s.i.), and leakage usually occurs considerably sooner since after the maximum interference of one thousandth of an inch (.001″) is worn off liquid is easily bypassed.

Seal friction in my improved seals is drastically reduced, usually to one tenth, or less, of the friction encountered in prior liquid spring seals in similar applications. Furthermore, the static friction of the improved seals is substantially the same as the sliding friction, whereas prior art seals exhibit considerably larger static friction than sliding friction.

When the seals of this invention are utilized in liquid springs having low internal pressures relative to liquid springs in general, for example, in ranges not exceeding ten to twelve thousand pounds per square inch (10,000 to 12,000 p.s.i.) it has been found that the seals will last almost indefinitely. This is particularly important with respect to liquid springs designed for use in automotive suspensions such as the type as illustrated in Figures 1 and 2. The drastically lower seal friction and the ability to stand up under side loads are vitally important with respect to automotive suspension applications of these improved seals.

Variations and modifications may be effected without departing from the scope of novel concepts of the present invention.

I claim:

1. A seal construction for preventing leakage of compressible materials at or below a given pressure comprising a metallic core member having a pressure sealing surface, a pliable packing ring disposed adjacent and circumferentially co-extensive with the pressure sealing surface of said core member, and a sleeve of high strength plastic secured about the pressure sealing surface of said core member and having an annular portion extending over at least a portion of said packing ring, said sleeve having a thickness below that which will allow cold extrusion of said high strength plastic at said given pressure.

2. In a compressible materials spring including a spring chamber member and a metallic piston member reciprocably disposed therein with a clearance provided between the piston member and the wall of the chamber member, a seal for preventing leakage through said clearance at or below a given pressure comprising a sleeve of high strength plastic secured about one of said members and filling the clearance between the piston members and the wall of the chamber member and providing a bushing therebetween, said sleeve having an annular extended portion not supported by said one member and having a substantially uniform thickness below that which will allow cold extrusion of said high-strength plastic at said given pressure, and resilient sealing means disposed adjacent and bearing radially against said extended portion of said sleeve to resiliently urge said extended portion into sealing engagement the other of said members.

3. In a compressible material spring including a spring chamber member and a metallic piston member reciprocably disposed therein with a clearance provided between the piston member and the wall of the chamber member, a seal for preventing leakage through said clearance at or below a given pressure comprising a layer of high strength plastic secured on one of said members filling the clearance between the piston member and the wall of the chamber member and providing a bushing therebetween, said layer being sufficiently thin to prevent cold extrusion of the high strength plastic at said given pressure, and a spring sealing ring of resilient high strength plastic material disposed adjacent the inner end of and circumferentially co-extensive with said layer.

4. A seal according to claim 3 wherein said spring sealing ring is generally square in cross section with a thickness at least twice the thickness of said layer, said spring sealing ring having a slight interference fit with the other of said members.

5. In a compressible material spring including a spring chamber member and a metallic piston member reciprocably disposed therein with a clearance provided between the piston member and the wall of the chamber member and with one of said members having a radial annular surface formed therein, a seal for preventing leakage through said clearance at or below a given pressure comprising a layer of high strength plastic secured on said one member filling the clearance between the piston member and the wall of the spring chamber member and having a portion covering and secured to said radial annular surface, said layer being sufficiently thin to prevent cold extrusion of the high strength plastic at said given pressure, and sealing means disposed adjacent and circumferentially co-extensive with the portion of said layer secured to said radial annular surface.

6. A seal construction for preventing leakage of compressible non-gaseous material at or below a given pressure comprising a metallic core member having a pressure sealing surface, a layer of high strength plastic secured on the pressure sealing surface of said core member, and a non-metallic sealing element disposed adjacent and circumferentially coextensive with the pressure sealing surface of said core member, said layer of high strength plastic being of a thickness below that which will allow cold extrusion of said high strength plastic at said given pressure.

7. A seal construction according to claim 6 wherein said sealing element includes a pliable packing ring.

8. A seal construction according to claim 6 wherein said sealing element comprises a pliable packing ring and an elastic hoop formed of high strength plastic material overlying said ring.

9. In a compressible material spring including a spring chamber member and a metallic piston member reciprocably disposed therein with a clearance provided between the piston member and the wall of the chamber member, a seal for preventing leakage through said clearance at or below a given pressure comprising a layer of high strength plastic secured on one of said members and engaging the other of said members to fill the clearance between said members and to provide a bushing therebetween, said layer being sufficiently thin to prevent cold extrusion of the high strength plastic through said clearance at said given pressure, and a non-metallic sealing element disposed adjacent the inner end of and circumferentially coextensive with said layer.

10. A seal construction according to claim 9 wherein said sealing element includes a pliable packing ring.

11. A seal construction according to claim 9 wherein said sealing element comprises a pliable packing ring and an elastic hoop formed of high strength plastic material overlying said ring.

References Cited in the file of this patent

UNITED STATES PATENTS

| Re. 24,440 | Groen | Mar. 4, 1958 |
| 2,708,573 | Rovoldt | May 17, 1955 |
| 2,742,333 | Taylor | Apr. 17, 1956 |
| 2,757,994 | Snyder | Aug. 7, 1956 |
| 2,807,511 | Fleming | Sept. 24, 1957 |

FOREIGN PATENTS

| 754,870 | Great Britain | Aug. 15, 1956 |

OTHER REFERENCES

Automotive Industries Publication, Sept. 1, 1954 pp. 107–108.